(12) United States Patent
Shiau

(10) Patent No.: US 8,289,493 B2
(45) Date of Patent: *Oct. 16, 2012

(54) DISPLAY PANEL HAVING DIFFERENT THICKNESS OF ALIGNMENT LAYERS IN DIFFERENT REGIONS

(75) Inventor: Yi-Hau Shiau, Taichung County (TW)

(73) Assignee: Au Optronics Corporation, Hsinchu (TW)

( * ) Notice: Subject to any disclaimer, the term of this patent is extended or adjusted under 35 U.S.C. 154(b) by 16 days.

This patent is subject to a terminal disclaimer.

(21) Appl. No.: 12/876,225

(22) Filed: Sep. 6, 2010

(65) Prior Publication Data

US 2011/0085119 A1 Apr. 14, 2011

Related U.S. Application Data

(63) Continuation-in-part of application No. 12/624,422, filed on Nov. 24, 2009, now Pat. No. 8,223,309.

(30) Foreign Application Priority Data

Oct. 13, 2009 (TW) ................................ 98134640 A
May 20, 2010 (TW) ................................ 99116094 A

(51) Int. Cl.
  *G02F 1/1339* (2006.01)
  *G02F 1/1345* (2006.01)
  *G02F 1/1337* (2006.01)
(52) U.S. Cl. ......... 349/153; 349/128; 349/152; 349/190
(58) Field of Classification Search ................... 349/128, 349/152–154, 190
See application file for complete search history.

(56) References Cited

U.S. PATENT DOCUMENTS

| 6,099,786 A | 8/2000 | Hu et al. |
| 6,724,448 B2 | 4/2004 | Nakahara |
| 2006/0197902 A1* | 9/2006 | Cho et al. ................ 349/153 |
| 2007/0296899 A1* | 12/2007 | Murade .................. 349/139 |

FOREIGN PATENT DOCUMENTS

| JP | 08-262444 | 10/1996 |
| JP | 10-282515 | 10/1998 |
| JP | 11-038444 | 2/1999 |
| JP | 11-142851 | 5/1999 |
| JP | 2006-301115 | 11/2006 |

OTHER PUBLICATIONS

"First Office Action of China Counterpart Application", issued on Apr. 21, 2011, p1-p4, in which the listed reference was cited.

* cited by examiner

*Primary Examiner* — Jessica M Merlin
(74) *Attorney, Agent, or Firm* — Jianq Chyun IP Office

(57) ABSTRACT

A display panel having a first region, a second region and a third region is provided. The display panel includes an active device array substrate, an opposite substrate, a display medium between the active device array substrate and the opposite substrate, and spacers arranged between the active device array substrate and the opposite substrate for maintaining a cell gap. The active device array substrate includes an active device array in the first region, a pad in the second region, a driving circuit in the third region, and a first alignment layer covering the first region, the second region and the third region. A thickness of the first alignment layer in the third region corresponding to the driving circuit is increased to be greater than those in the first region and the second region for buffering the pressure applied by the spacers.

12 Claims, 9 Drawing Sheets

DISPLAY PANEL HAVING DIFFERENT THICKNESS OF ALIGNMENT LAYERS IN DIFFERENT REGIONS

CROSS-REFERENCE TO RELATED APPLICATION

This is a continuation-in-part application of Patent Application Ser. No. 12/624,422 filed on Nov. 24, 2009, which claims the priority benefit of Taiwan patent application serial no. 98134640, filed on Oct. 13, 2009 and is now pending. This continuation-in-part application also claims the priority benefit of Taiwan patent application serial no. 99116094, filed on May 20, 2010. The entirety of each of the above-mentioned patent applications is hereby incorporated by reference herein and made a part of this specification.

BACKGROUND OF THE INVENTION

1. Field of the Present Invention

The present invention relates to a display panel and a manufacturing method thereof, and particularly to the display panel and the manufacturing method provided with a design of its alignment layer and relevant elements to eliminate light leakage.

2. Description of Related Art

The relative position of the alignment layer and the sealant between an upper substrate and a lower substrate is considerable in fabricating the present liquid crystal display panel, so as to comply with the design of slim bezel or obtain large usable area on the panel. Furthermore, prevention of the light leakage and the signal transmission between the upper substrate and the lower substrate are still important issues in the design of slim bezel.

A conventional liquid crystal display panel has alignment layers entirely formed on the upper substrate and the lower substrate respectively in a uniform thickness. However, when a misalignment occurs in the assembly of the upper substrate and the lower substrate, an alignment layer at unexpected location may obstruct the electrical connection built between an electrode layer of the upper substrate and a pad of the lower substrate by a conductive member in the sealant. In addition, the alignment layer at unexpected location may further affect the alignment of liquid crystal molecules and thus result in light leakage.

Moreover an alignment layer formed with an opening corresponding to the position of the conductive member is further proposed in the prior art to conduct the upper substrate and the lower substrate via the conductive member. Nonetheless, light leakage still occurs at the position of the opening, and thereby affects the display quality.

Furthermore, some of the liquid crystal display panels are provided with active device array substrates having driving circuits fabricated thereon. However, the driving circuits are probably pressed and damaged by spacers when assembling the liquid crystal display panels. Specifically, an upper conductive layer and a lower conductive layer of the driving circuit may be pressed and deformed by the spacers to contact with each other and cause a short there between.

SUMMARY OF THE INVENTION

The present invention is directed to a display panel, which complies with the requirement of slim bezel and prevent the obstruction of the alignment layer between the electrode layer and the pad, so as to conduct the alignment layer between the electrode layer and the pad, and provide an effective alignment near the conductive member to prevent light leakage due to abnormal alignment of the display medium, e.g. liquid crystal molecules.

The present invention is further directed to a display panel capable of preventing driving circuits on an active device array substrate from being pressed and damaged by spacers.

The present invention is further directed to an active device array substrate applied to the aforementioned display panel.

The present invention is further directed to a manufacturing method of the aforementioned display panel.

As embodied and broadly described herein, the present invention provides a display panel having a first region and a second region. The display panel comprises an active device array substrate, an opposite substrate, a display medium and a conductive member. The active device array substrate comprises an active device array, a pad located in the second region and a first alignment layer covering the first region and the second region. The thickness of the first alignment layer in the first region is substantially greater than a thickness of the first alignment layer in the second region, and the ratio of the thickness of the first alignment layer in the second region to the thickness of the first alignment layer in the first region is substantially greater than zero and substantially less than or equal to 0.43. In addition, the opposite substrate is disposed opposite to the active device array substrate. The opposite substrate includes an electrode layer and a second alignment layer covering the electrode layer. The thickness of the second alignment layer in the first region is substantially greater than a thickness of the second alignment layer in the second region, and the ratio of the thickness of the second alignment layer in the second region to the thickness of the second alignment layer in the first region is substantially greater than zero and substantially less than or equal to 0.43. The display medium is disposed between the active device array substrate and the opposite substrate. The conductive member is disposed between the active device array substrate and the opposing substrate, and the conductive member is located in the second region and corresponding to the pad. The conductive member penetrates the first alignment layer and the second alignment layer to connect the electrode layer and the pad.

In an embodiment, the first region comprises a display region, the second region is located in a peripheral circuit region outside the display region, and the active device array is located in the display region.

In an embodiment, the display panel further comprises a sealant disposed in the peripheral circuit region, wherein the conductive member is located within the sealant.

In an embodiment, the display medium is a liquid crystal layer.

In an embodiment, the display panel further has a third region, the active device array substrate further comprises a driving circuit located in the third region, and the first alignment layer further covers the third region. The thickness of the first alignment layer in the third region is substantially greater than a thickness of the first alignment layer in the first region or the second region In an embodiment, the first region comprises a display region, the active device array is located in the display region, and the third region is located in a peripheral circuit region outside the display region.

The present invention further provides an active device array substrate having a first region and a second region. The active device array substrate comprises an active device array, a pad located in the second region and a first alignment layer covering the first region and the second region. The thickness of the first alignment layer in the first region is substantially greater than a thickness of the first alignment layer in the second region, and the ratio of the thickness of the first alignment layer in the second region to the thickness of the first alignment layer in the first region is substantially greater than zero and substantially less than or equal to 0.43.

In an embodiment, the first region comprises a display region, the second region is located in a peripheral circuit region outside the display region, and the active device array is located in the display region.

In an embodiment, the active device array substrate further has a third region and a driving circuit located in the third region, and the first alignment layer further covers the third region. The thickness of the first alignment layer in the third region is substantially greater than a thickness of the first alignment layer in the first region or the second region In an embodiment, the first region comprises a display region, the active device array is located in the display region, and the third region is located in a peripheral circuit region outside the display region.

The present invention further provides a manufacturing method of a display panel. Firstly, an active device array substrate having a first region and a second region is provided. The active device array substrate includes an active device array, a pad located in the second region and a first alignment layer covering the first region and the second region. The thickness of the first alignment layer in the first region is substantially greater than a thickness of the first alignment layer in the second region, and the ratio of the thickness of the first alignment layer in the second region to the thickness of the first alignment layer in the first region is substantially greater than zero and substantially less than or equal to 0.43. Then, an opposite substrate disposed opposite to the active device array substrate is provided. The opposite substrate includes an electrode layer and a second alignment layer covering the electrode layer. The thickness of the second alignment layer in the first region is substantially greater than a thickness of the second alignment layer in the second region, and the ratio of the thickness of the second alignment layer in the second region to the thickness of the second alignment layer in the first region is substantially greater than zero and substantially less than or equal to 0.43. Next, a display medium and a conductive member are provided between the active device array substrate and the opposite substrate, wherein the conductive member is located in the second region and corresponding to the pad. After bonding the active device array substrate and the opposite substrate, the conductive member penetrates the first alignment layer and the second alignment layer to connect the electrode layer and the pad.

In an embodiment, the method of forming the first alignment layer or the second alignment layer comprises performing a transfer printing process by an Asahi Photosensitive Resin printing plate (APR printing plate) to print alignment material on the active device array substrate or the opposite substrate.

In an embodiment, the APR printing plate has a plurality of transferring bumps thereon, and the distribution density of the transferring bumps corresponding to the second region is substantially less than the distribution density of the transferring bumps corresponding to the first region.

In an embodiment, the APR printing plate has a plurality of transferring bumps thereon, and the height of the transferring bumps corresponding to the second region is substantially less than the height of the transferring bumps corresponding to the first region.

In an embodiment, the method of forming the first alignment layer and the second alignment layer comprises inkjet printing.

In an embodiment, the first region comprises a display region, the second region is located in a peripheral circuit region outside the display region, and the active device array is located in the display region.

In an embodiment, the manufacturing method further comprises forming a sealant in the peripheral circuit region to surround the display region before bonding the active device array substrate and the opposite substrate, wherein the conductive member is disposed within the sealant.

In an embodiment, the active device array substrate further has a third region and a driving circuit located in the third region, and the first alignment layer further covers the third region. The thickness of the first alignment layer in the third region is greater than a thickness of the first alignment layer in the first region or the second region In an embodiment, the first region comprises a display region, the active device array is located in the display region, and the third region is located in a peripheral circuit region outside the display region.

In an embodiment, the APR printing plate has a plurality of transferring bumps thereon, and the distribution density of the transferring bumps corresponding to the first region is less than the distribution density of the transferring bumps corresponding to the third region.

In an embodiment, the APR printing plate has a plurality of transferring bumps thereon, and the height of the transferring bumps corresponding to the first region is less than the height of the transferring bumps corresponding to the third region.

Since the thickness of the alignment layer corresponding to the conductive member and the pad is less than the alignment layer in other region, the conductive member can penetrate the alignment layer rather than be obstructed by the alignment layer, so as to conduct the electrode layer and the pad. Furthermore, the alignment layer is preserved to completely cover the region except the bonding area of the conductive member, so as to provide an effective alignment near the conductive member in preventing light leakage due to abnormal alignment of the display medium, e.g. liquid crystal molecules.

In addition, to prevent the driving circuit on the active device array substrate from being pressed and damaged by the spacers, the first alignment layer in the corresponding region can be increased. In other words, the thickness of the first alignment layer corresponding to the driving circuit is greater than the thickness of the first alignment layer in other region, so as to buffer the pressure applied by the spacers and prevent the driving circuit from being pressed and damaged by the spacers.

It is to be understood that both the foregoing general descriptions and the following detailed embodiments are exemplary and are, together with the accompanying drawings, intended to provide further explanation of technical features and advantages of the present invention.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

The present invention modulates thicknesses of the alignment layer in different regions of the display panel, wherein the thickness of the alignment layer corresponding to the pad and the conductive member is substantially less than that in the other region, such that after the active device array substrate and the opposite substrate are bonded with each other, the conductive member can penetrate the alignment layers on the active device array substrate and the opposite substrate respectively to conduct the electrode layer and the pad for providing a signal transmission path therebetween.

The structure and the manufacturing method of the display panel of the present invention will be illustrated in the following embodiments.

Figure 1:
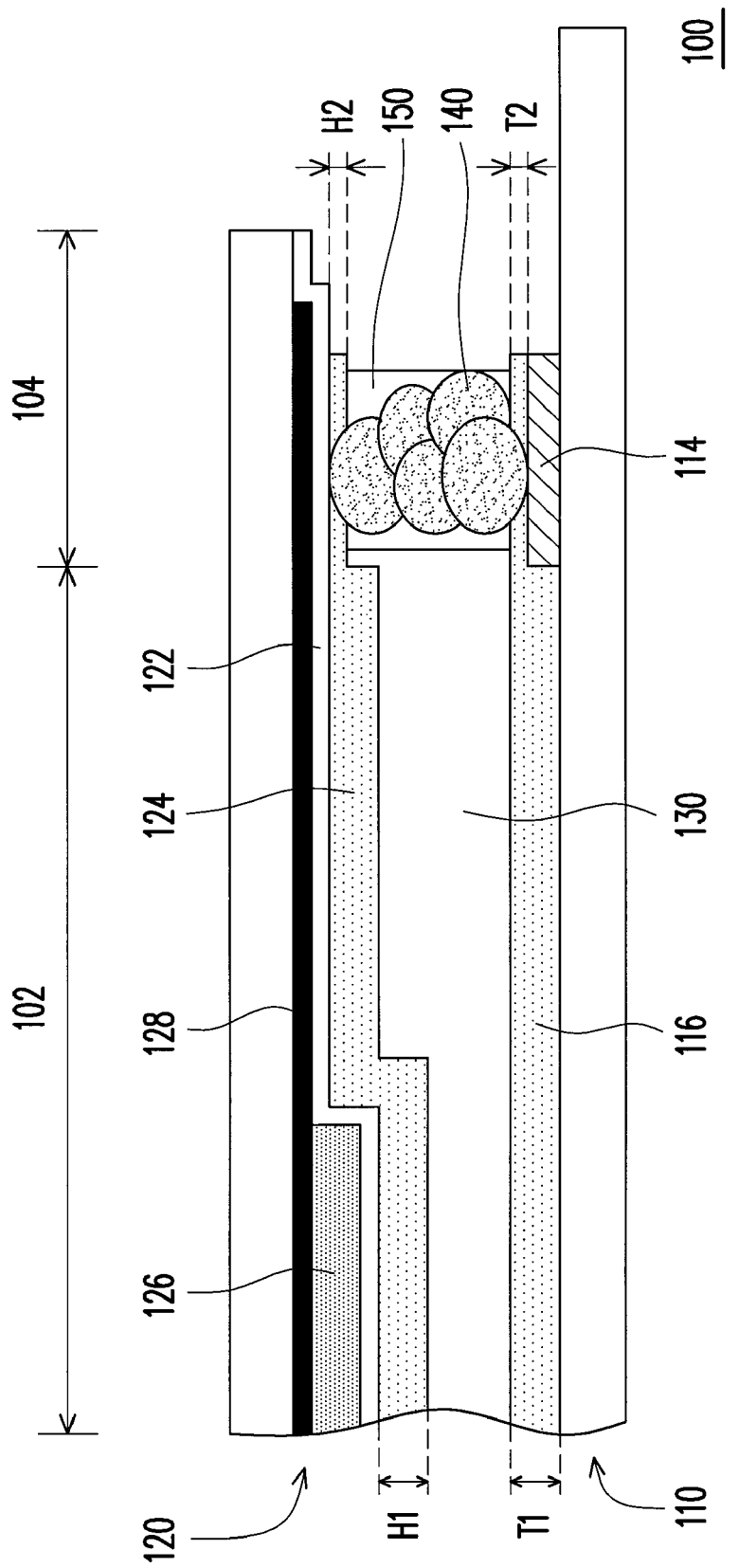
FIG. 1 illustrates a partial sectional view of a display panel according to an embodiment of the present invention.
Figure 2:
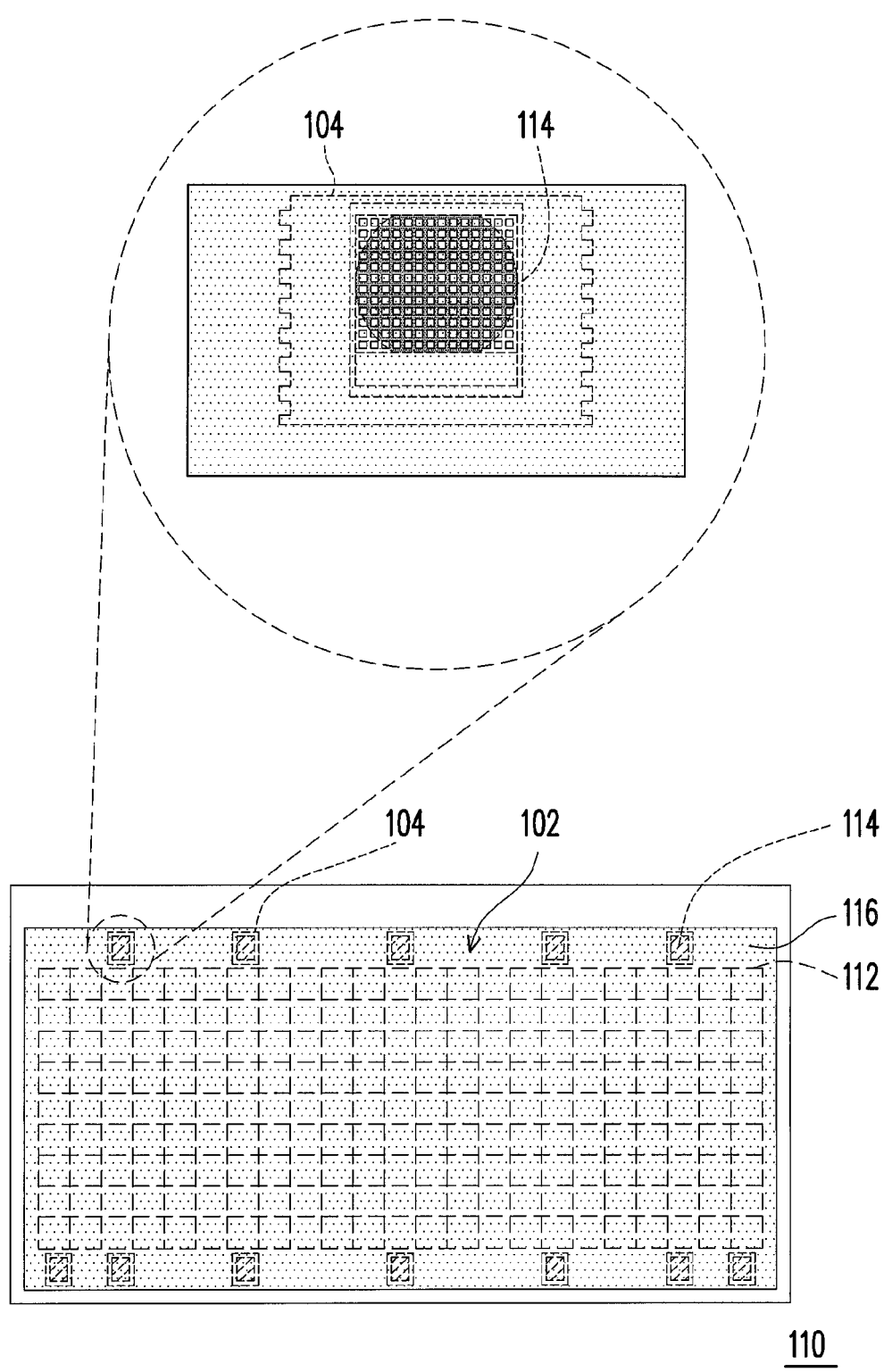
FIG. 2 is a top view of an active device array substrate of the display panel in FIG. 1.

FIG. 1 is a partial sectional view of a display panel according to an embodiment of the present invention. FIG. 2 is a top view of an active device array substrate of the display panel in FIG. 1. Referring to FIGS. 1 and 2, the display panel 100 comprises an active device array substrate 110, an opposite substrate 120, a display medium 130 and a conductive member 140. The active device array substrate 110 comprises an active device array 112, at least a pad 114 (FIG. 1 show plural pads 114) and a first alignment layer 116. The display panel 100 has a first region 102 and a second region 104. In this embodiment, the region corresponding to the pads 114 is defined as the second region 104, and the other region belongs to the first region 102. In addition, the first alignment layer 116 covers the first region 102 and the second region 104.

As shown in FIG. 2, the pads 114 may be transfer pads located in the peripheral circuit region of the active device array substrate 110. The pads 114 are arranged around the display region in the substantially center of the active device array substrate 110 for transmitting signals between the active device array substrate 110 and the opposite substrate 120. The active device array 112 is located in the display region in the substantially center of the active device array substrate 110. In other words, the first region 102 defined in this embodiment includes the display region, while the second region 104 is located in the peripheral circuit region.

However, definition of the first region 102 and the second region 104 in this embodiment is exemplary, and may vary with design requirements. For example, the definition of the first region 102 and the second region 104 depends on the position of the pads 114. That is, according to the variation of function and position of the pads 114, both of the first region 102 and the second region 104 may be arranged in the display region or other positions.

Referring to FIGS. 1 and 2, the opposite substrate 120 is disposed opposite to the active device array substrate 110, and the opposite substrate 120 comprises an electrode layer 122 and a second alignment layer 124. The electrode layer 122 may function as a common electrode, while the second alignment layer 124 covers the electrode layer 122. The display medium 130 is disposed between the active device array substrate 110 and the opposite substrate 120. In addition, the conductive member 140 is disposed between the active device array substrate 110 and the opposing substrate 120, wherein the conductive member 140 is located in the second region 104 and corresponding to the pads 114.

The illustrated embodiment provides no limitation to the types of the display panel 100, wherein performance of the display panel 100 varies with the type of the display medium 130. For example, the display medium 130 can be a liquid crystal material or other materials operated on the same principle. If the liquid crystals are used as the display medium 130, the display panel 100 is a liquid crystal display panel. In the following embodiments, the liquid crystal display panel is illustrated as an example, while those skilled in the art may further apply the concept of the illustrated embodiments to other types of display panel.

In the present embodiment, the active device array substrate 110 may be a TFT array substrate, while the opposite substrate 120 may be a color filter substrate comprising a color filter layer 126 and a black matrix 128. In other embodiments, the active device array substrate 110 may be a COA (color filter on array) substrate integrated the color filter layer 126 onto the active device array 112, a BOA (black matrix on array) substrate integrated with further the black matrix 128 onto the active device array 112, or an AOC (array on color filter) substrate integrated the active device array 112 onto the color filter layer 126. Herein, the opposite substrate 120 is provided without a color filter layer.

Referring to FIGS. 1 and 2, the present invention modulates thicknesses of the first alignment layer 116 of the active device array substrate 110 and the second alignment layer 124 of the opposite substrate 120 in different regions of the display panel 100, wherein the thicknesses of the first alignment layer 116 and the second alignment layer 124 both corresponding to the pad 114 and the conductive member 140 are substantially less than those in the other region, such that after the active device array substrate 110 and the opposite substrate 120 are bonded with each other, the conductive member 140 can penetrate the first alignment layer 116 and the second alignment layer 124 to conduct the electrode layer 122 and the pads 114.

Particularly, the illustrated embodiment reduce the thicknesses of the first alignment layer 116 and the second alignment layer 124 corresponding to the pads 114 and the material 140 rather than remove them all, such that the conductive member 140 can penetrate the first alignment layer 116 and the second alignment layer 124 after bonding the active device array substrate 110 with the opposite substrate 120, so as to conduct the electrode layer 122 and the pads 114. Preferably, the ratio of a thickness H2 of the first alignment layer 116 in the second region 104 (i.e. corresponding to the pads 114) to a thickness H1 of the first alignment layer 116 in the first region 102 is substantially greater than zero and substantially less or equal to 0.43. As embodied in a conventional alignment layer, the first alignment layer 116 in the first region 102 has the thickness H1 about 700 angstrom or more, while the thickness H2 of the first alignment layer 116 in the second region 104 can be obtained by multiplying the thickness H1 by the ratio such as about 0.43 and regarded as being substantially equal to or less than 300 angstrom. Similarly, the ratio of a thickness T2 of the second alignment layer 124 in the second region 104 to a thickness T1 of the second alignment layer 124 in the first region 102 is substantially greater than zero and substantially less or equal to 0.43. As embodied in a conventional alignment layer, the second alignment layer 124 in the first region 102 has the thickness T1 about 700 angstrom or more, while the thickness T2 of the second alignment layer 116 in the second region 104 can be obtained by multiplying the thickness T1 by the ratio such as about 0.43 and regarded as being substantially equal to or less than 300 angstrom.

In addition, the display panel 100 of the embodiment further comprises a sealant 150 disposed in the peripheral circuit region of the display panel 100 for surrounding the display region and sealing the display medium 130 between the active device array substrate 110 and the opposite substrate 120. In this embodiment, the conductive member 140 is disposed in the sealant 150. Alternatively, the conductive member 140 may disposed outside the sealant 150 in other embodiments of the present invention. The conductive member 140 herein may be embodied as any type of applicable material, such as silver paste, AU balls, or transfer members. In other words, the conductive member 140 can be made of conductive member or formed by an insulation material with a conductive coating thereon. Hence, this embodiment does not restrict the composition of the conductive member.

Moreover, the present invention provides no limitation on the position of the conductive member. Except being disposed within the sealant 150 as the conductive member 140 illustrated in the above embodiment, the conductive member of other embodiments can further be disposed on any proper position. In accordance with the definition of the first region 102 and the second region 104, the position of the conductive member 140 depends on the arrangement of the pads 114. That is, complying with the position of the pads, the conductive member 140 may be located in the display region rather than within the sealant 150.

Accordingly, in the above illustrated manufacturing method of the display panel, the conductive member 140 can penetrate the first alignment layer 116 of the active device array substrate 110 and the second alignment layer 124 of the opposite substrate 120 after bonding the active device array substrate 110 and the opposite substrate 120 and forming the display medium 130 there between, so as to connect the electrode layer 122 and the pads 114 and provide a signal transmission path between the active device array substrate 110 and the opposite substrate 120. Furthermore, an optional sealant 150 can be formed in the peripheral circuit region of the display panel 100 to surround the display region before bonding the active device array substrate 110 and the opposite substrate 120, wherein the conductive material 140 may be disposed within the sealant 150.

In this illustrated embodiment, the method of forming the first alignment layer 116 or the second alignment layer 124 comprises performing a resin APR printing plate to print alignment material on the active device array substrate 110 or the opposite substrate 120, so as to provide the first alignment layer 116 with different thicknesses or the second alignment layer 124 with different thicknesses. Particularly, a surface of the APR printing plate can be configured be achieve the effect of forming the first alignment layer 116 or the second alignment layer 124 with different thicknesses in a single printing step.

Figure 3A:
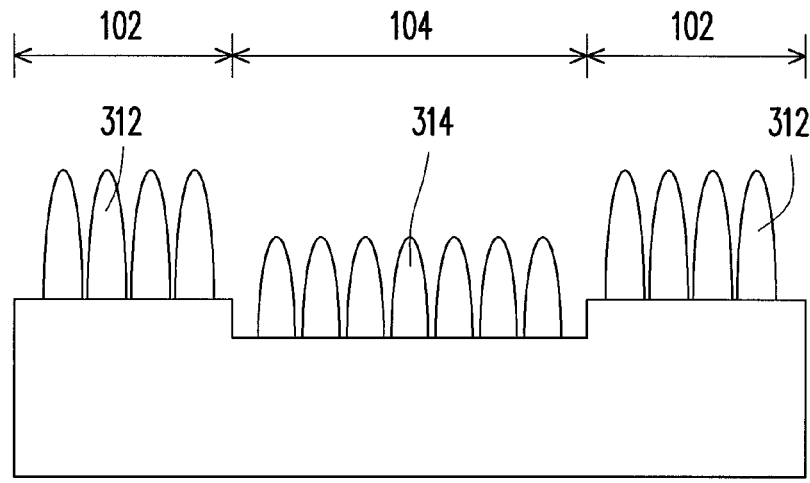
FIG. 3A illustrates a partial sectional view of an APR printing plate for forming an alignment according to an embodiment of the present invention.

FIG. 3A is a partial sectional view of an APR printing plate for forming the first alignment layer 116 or the second alignment layer 124 according to an embodiment of the present invention. Referring to FIG. 3A, the APR printing plate 300 has a plurality of transferring bumps 312 and 314 thereon, wherein the height of the transferring bumps 314 corresponding to the second region 104 is substantially less than the height of the transferring bumps 312 corresponding to the first region 102. Herein, the heights of the transferring bumps 312 and 314 refer to relative height difference between the transferring bumps 312 and 314, wherein the height difference may be adjusted by changing heights of the substrate below the transferring bumps 312 and 314, i.e., arranging the transferring bumps 312 and 314 on planes in different heights, or by changing lengths of the transferring bumps 312 and 314.

Otherwise, the height difference can be formed by merely changing the lengths of the transferring bumps 312 and 314.

Figure 3B:
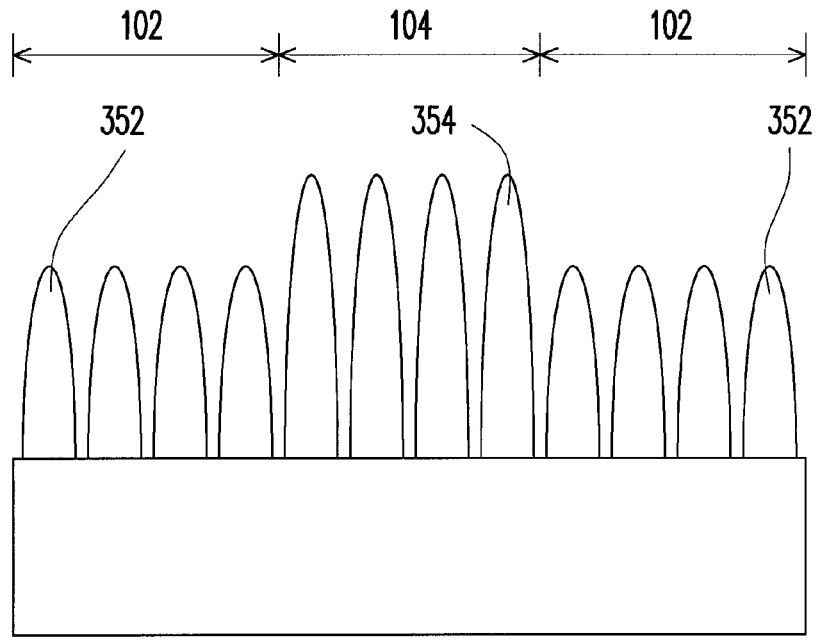
FIG. 3B illustrates a partial sectional view of another APR printing plate for forming an alignment according to an embodiment of the present invention.

FIG. 3B is a partial sectional view of another APR printing plate for forming the first alignment layer 116 or the second alignment layer 124. The APR printing plate 350 of the present embodiment and the aforementioned APR printing plate 300 are different in that the transferring bumps 352 and 354 of the APR printing plate 350 are arranged on the same plane, and the height difference on the APR printing plate 350 between the regions 102 and 104 are formed by respectively arranging transferring bumps 352 and 354 with different lengths thereon, wherein the height of the transferring bumps 354 corresponding to the second region 104 is substantially less than the height of the transferring bumps 352 corresponding to the first region 102. The APR printing plate 350 can provide a printing effect similar to the above APR printing plate 300, i.e., forming the first alignment layer 116 or the second alignment layer 124 with different thicknesses in a single printing step.

Figure 4:
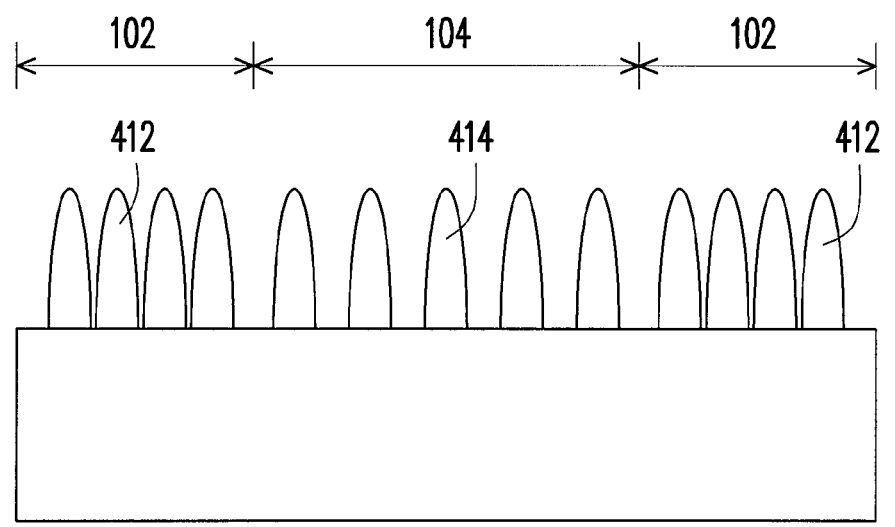
FIG. 4 illustrates a partial sectional view of further another APR printing plate for forming an alignment according to another embodiment of the present invention.
Figure 5A:
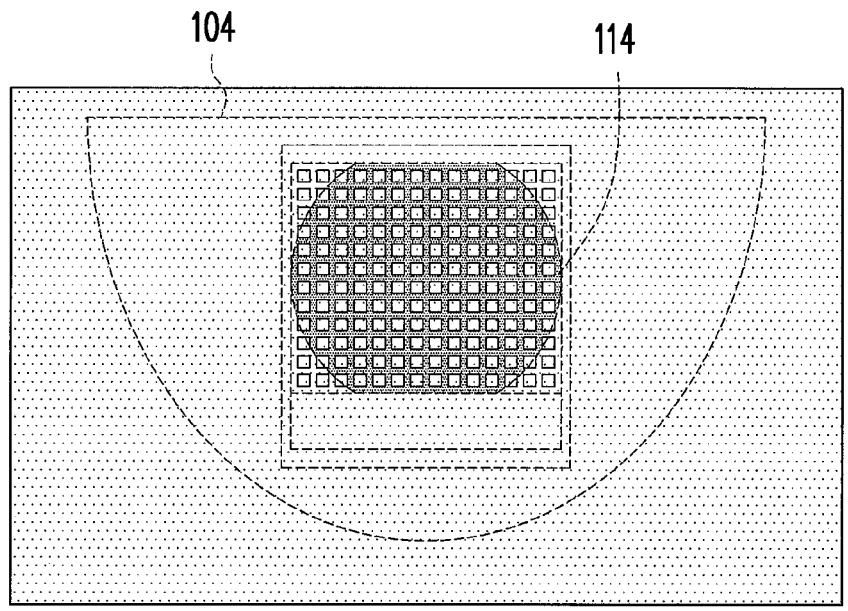
FIGS. 5A through 5D are partial enlarged views of the pad and the surrounding structure.
Figure 5B:
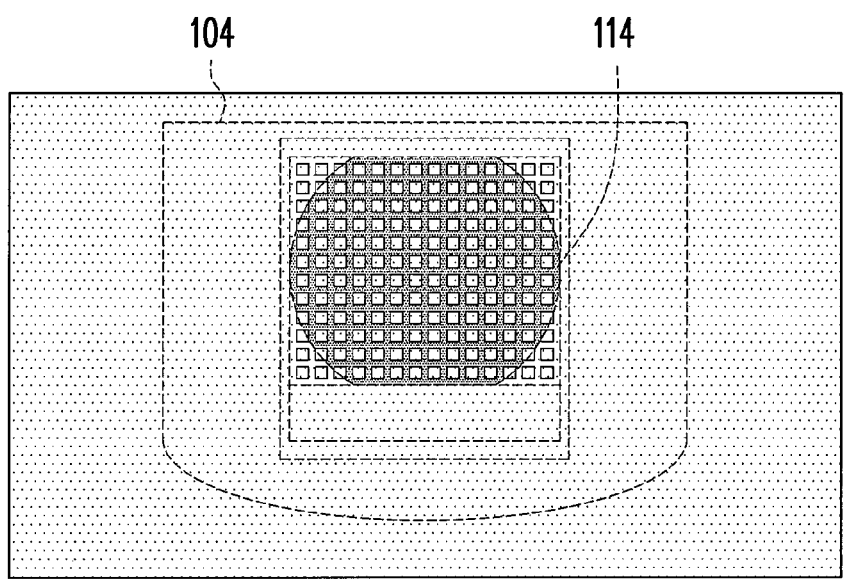
Figure 5C:
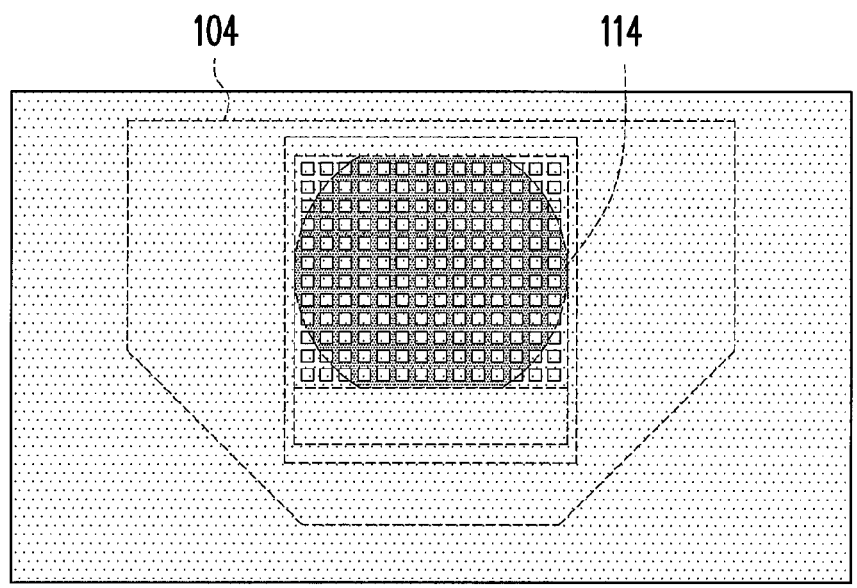
Figure 5D:
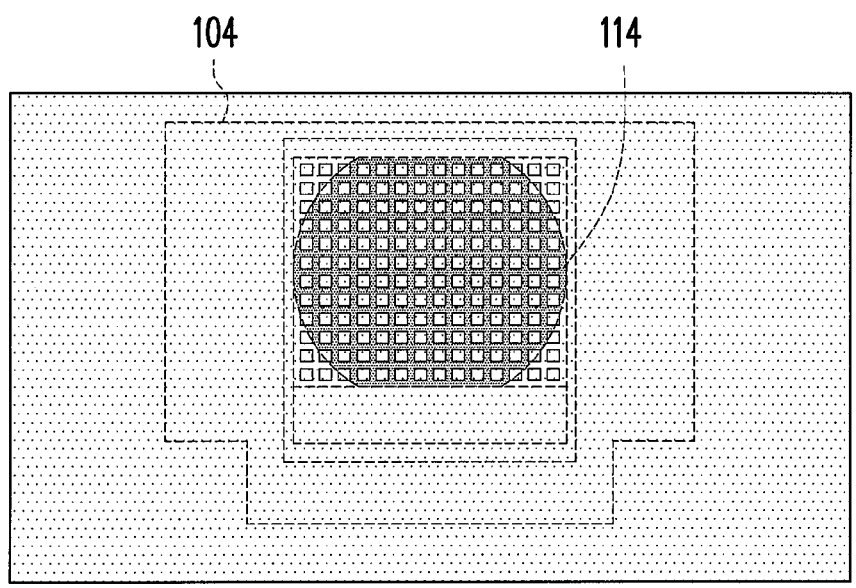

FIG. 4 is a partial sectional view of an APR printing plate for forming the first alignment layer 116 or the second alignment layer 124 according to another embodiment of the present invention. Referring to FIG. 4, the APR printing plate 400 has a plurality of transferring bumps 412 and 414 thereon, wherein the distribution density of the transferring bumps 414 corresponding to the second region 104 is substantially less than the distribution density of the transferring bumps 412 corresponding to the first region 102. In this embodiment, the distribution density of the transferring bumps 412 corresponding to the first region 102 may be 200 per unit area, while the distribution density of the transferring bumps 414 corresponding to the second region 104 may be 100 per unit area. However, the distribution density of the transferring bumps 412 or 414 is not limited thereto.

The height or the distribution density of the surface structure (i.e. the transferring bumps) is regulated to control the amount of the alignment material coated on the APR printing plate in printing, so as to reduce the alignment material transferred to the second region 104 and thus forming the alignment layer in a thinner thickness.

Likewise, except the method of forming the first alignment layer 116 with different thicknesses or the second alignment layer 124 with different thicknesses in the above embodiment, the first alignment layer 116 or the second alignment layer 124 can further be formed by other proper methods, such as inkjet printing, photolithography, dry film attaching, or the combinations thereof.

In addition, preferably, the second region defined in the above embodiments requires merely covering the bonding region of the pads 114 and the conductive members 140. However, regarding the precision and the probable misalignment of the printing process or other process, the size of the second region 104 may usually be substantially greater than or equal to the size of the pads 114, to ensure that the conductive member 140 can successfully penetrate the first alignment layer 116 and the second alignment layer 124 in the second region 104, to conduct the electrode layer 122 and the pad 114. As shown in the partial enlarged view of FIG. 2, the size of the second region 104 is substantially greater than the size of the pad 114 so as to completely cover the pad 114. Otherwise, the shape of the second region 104 may vary with the shape of the pad 114. FIGS. 5A through 5D are partial enlarged views showing a variety of second regions 104 in different shapes and the corresponding pads 114. As embodied in forming the alignment layer by the APR printing plate, the surface structures on the APR printing plate can be regulated to form the second regions 104 in different shapes. Otherwise, as forming the second regions 104 in different shapes by performing photolithography process, masks in different patterns is required.

Furthermore, Referring to FIGS. 1 and 5A through 5D, the pad 114 can be formed in a mash pattern, so as to increase conductive area and improve the bondibility between the conductive member 140 and the pad 114.

However, shape, function, position and size of the pad are not limited in the present invention. Any pad configured in conducting with an opposite substrate of a display panel via a conductive member can be applied herein without departing the scope of the present invention. By which, an alignment layer in thinner thickness is provided corresponding to the pad, such that the conductive member can penetrate the thinner alignment layer and conduct the pad to the circuit of the opposite substrate.

Furthermore, the display panel of the present invention may be provided with spacers for maintaining a cell gap, and driving circuits such as gate drivers may be directly fabricated on the peripheral circuit region of the active device array substrate. To prevent the driving circuit from being pressed and damaged by the spacers, a thickness of the first alignment layer corresponding to the driving circuit can be increased to buffer the pressure applied by the spacers. The types of the part of the spacers may be ball spacer, photo spacer, fiber, rod, or other suitable materials.

Figure 6:
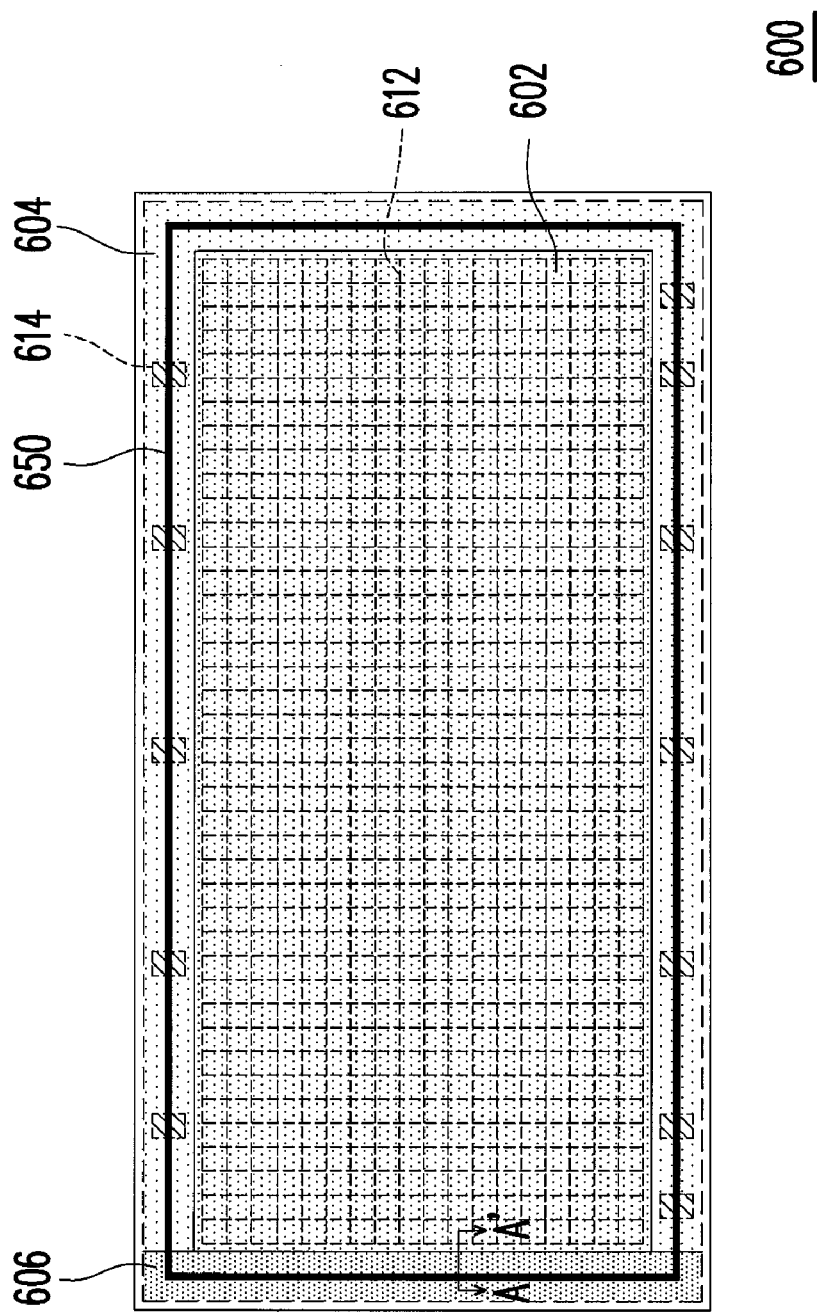
FIG. 6 is a schematic top view of a display panel according to another embodiment of the present invention.
Figure 7:
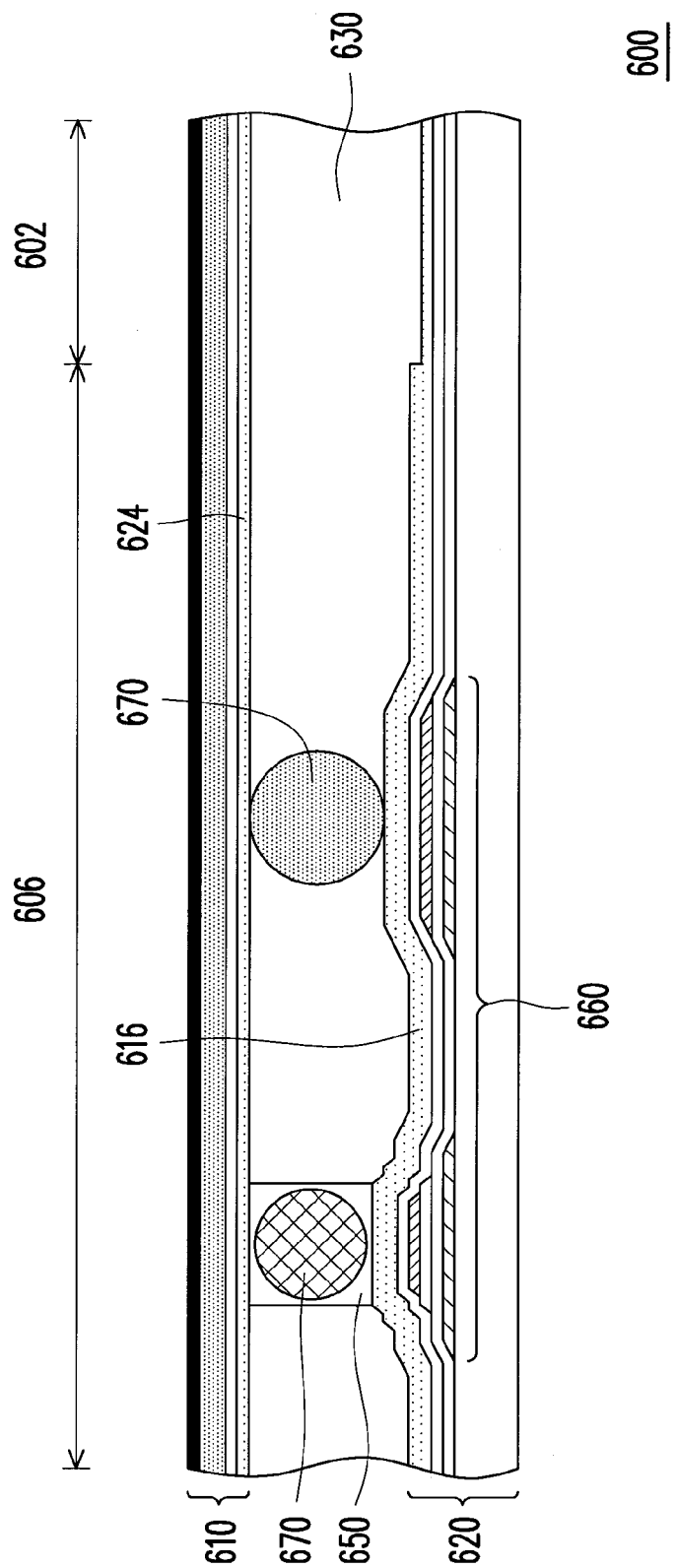
FIG. 7 is a schematic partial sectional view of the display panel along line A-A' in FIG. 6.

FIG. 6 is a schematic top view of a display panel according to another embodiment of the present invention. FIG. 7 is a schematic partial sectional view of the display panel along line A-A' in FIG. 6. In light of the above embodiment, only the difference between the two embodiments are illustrated herein, and the content of the aforementioned embodiment can be incorporated into the present embodiment for reference.

Referring to FIGS. 6 and 7, the display panel 600 further has a driving circuit 660 including gate drivers, wiring and etc. in the peripheral circuit region except the pads 614. A third region 606 corresponding to the driving circuit 660 can be defined in a periphery of the display panel 600. In other words, the display panel 600 has a first region 602, a second region 604 and a third region 606, wherein an active device array 612 is located in the first region 602 (e.g. a display region). The pads 614 may be transfer pads located in the peripheral circuit region of the display panel 600. The pads 614 are arranged around the display region in the substantially center of the display panel 600 and located in the second region 604 for transmitting signals between the active device array substrate 610 and the opposite substrate 620. The driving circuit 660 is located in the third region 606. The first alignment layer 616 and the second alignment 624 cover the first region 602, the second region 604 and the third region 606.

The display medium 630 is disposed between the active device array substrate 610 and the opposite substrate 620. The sealant 650 surrounds the display region of the display panel 600 and seals the display medium 630 between the active device array substrate 610 and the opposite substrate 620. In the present embodiment, the sealant 650 extends across the driving circuit 660 in the third region 606. Spacers 670 such as Au balls embedded in the sealant 650 or silica balls are disposed between the active device array substrate 610 and the opposite substrate 620 for maintaining the cell gap. The present embodiment does not restrict the composition of the spacers 670, for example, the part of the spacers may be photo spacer, fiber, rod, or other suitable materials.

To prevent the driving circuit 660 in the active device array substrate 610 from being pressed and damaged by the spacers 670, a thickness of the first alignment layer 616 in the third region 606 is increased to buffer the pressure applied by the spacers 670. In the present embodiment, the thicknesses of the first alignment 616 in the second region 604, the first region 602 and the third region 606, ordered from small to large, are for example substantially less than 300 angstrom, equal to 900 angstrom, and larger than 1500 angstrom. In other words, the thickness of the first alignment 616 in the first region 602 is substantially greater than the thickness of the first alignment 616 in the second region 604, and the thickness of the first alignment 616 in the third region 606 is substantially greater than the thickness of the first alignment 616 in the first region 602 or the thickness of the first alignment 616 in the second region 604. As the thickness of the first alignment 616 in the third region 606 is substantially greater than the thickness of the first alignment 616 in the first region 602 or the thickness of the first alignment 616 in the second region 604 has two types: first type, the thickness of the first alignment 616 in the third region 606 is substantially greater than the thickness of the first alignment 616 in the first region 602 and the thickness of the first alignment 616 in the second region 604, wherein the thickness of the first alignment 616 in the first region 602 is substantially greater than the thickness of the first alignment 616 in the second region 604 is the preferred embodiment of the invention. Second type, the thickness of the first alignment 616 in the first region 602 is substantially greater than or equal to the thickness of the first alignment 616 in the third region 606, wherein the thickness of the first alignment 616 in the first region 602 and the thickness of the first alignment 616 in the third region 606 are substantially greater than the thickness of the first alignment 616 in the second region 604 the other embodiment of the invention.

More specifically, as shown in FIG. 6, the thickness of the first alignment layer 616 in the third region 606 of the present embodiment is increased, and thus the pressure applied by the spacers 670 on the driving circuit 660 can be buffered owing to interlaying the thicker first alignment layer 616 between the spacers 670 and the driving circuit 660. Therefore, an upper conductive layer and a lower conductive layer of the driving circuit 660 are preserved from being deformed, a short caused by contact between the upper conductive layer and the lower conductive layer can be prevented, and damage or deformation of the structure of the driving circuit 660 can be eliminated.

According to the aforementioned embodiment, the method of forming the first alignment layer 616 or the second alignment layer 624 comprises performing a APR printing plate consists of the resin to print alignment material on the active device array substrate 610 or the opposite substrate 620, so as to provide the first alignment layer 616 with different thicknesses or the second alignment layer 624 with different thicknesses. Particularly, a surface of the APR printing plate can be configured be achieve the effect of forming the first alignment layer 616 or the second alignment layer 624 with different thicknesses in a single printing step.

Figure 8:
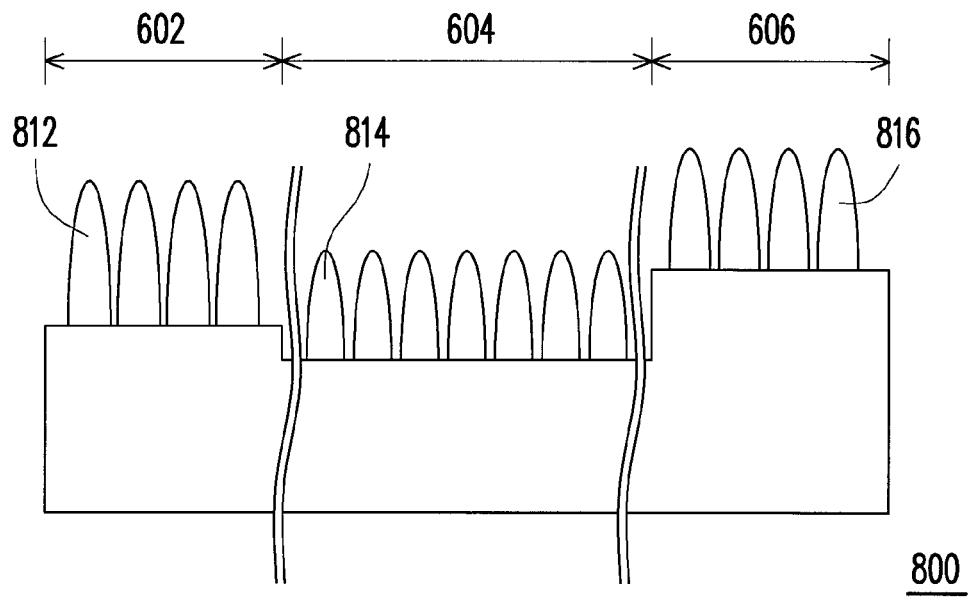
FIG. 8 illustrates a partial sectional view of an APR printing plate for forming an alignment according to another embodiment of the present invention.

FIG. 8 is a partial sectional view of an APR printing plate for forming the first alignment layer 616 according to an embodiment of the present invention. Referring to FIG. 8, the first alignment layer 616 comprises three parts in different thicknesses, wherein transferring bumps 812, 814 and 816 respectively located in the first region 602, the second region 604 and the third region 606 on the APR printing plate 800 are in different heights. The height of the transferring bumps 814 corresponding to the second region 604 is substantially less than the height of the transferring bumps 812 corresponding to the first region 602, and the height of the transferring bumps 816 corresponding to the third region 606 is substantially less than the height of the transferring bumps 812 corresponding to the first region 602.

Referring to the embodiments depicted in FIG. 3A, the transferring bumps 812 and 814 are arranged on different planes and located in different heights. Otherwise, as shown in FIG. 3B, the transferring bumps 812 and 814 can be arranged on the same plane, by which a height difference is formed by merely changing the lengths of the transferring bumps 812 and 814 for a similar printing effect.

Figure 9:
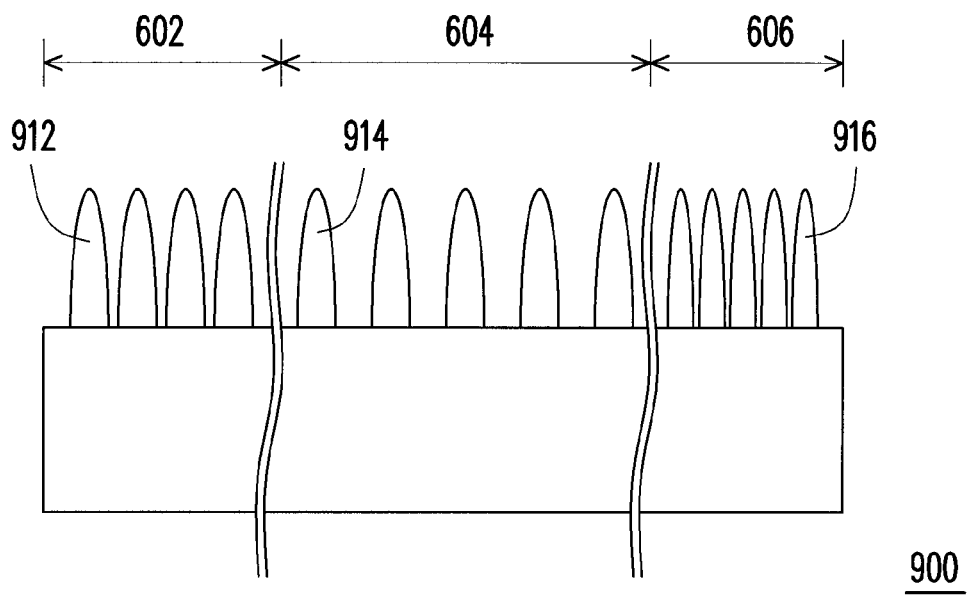
FIG. 9 illustrates a partial sectional view of another APR printing plate for forming an alignment according to another embodiment of the present invention.

FIG. 9 is a partial sectional view of an APR printing plate for forming the first alignment layer 616 or the second alignment layer 624 according to another embodiment of the present invention. Referring to FIG. 9, the first alignment layer 616 comprises three parts in different thicknesses, wherein transferring bumps 912, 914 and 916 respectively located in the first region 602, the second region 604 and the third region 606 on the APR printing plate 900 are in different heights. The distribution density of the transferring bumps 914 corresponding to the second region 604 is substantially less than the distribution density of the transferring bumps 912 corresponding to the first region 602, and the distribution density of the transferring bumps 916 corresponding to the third region 606 is substantially less than the distribution density of the transferring bumps 912 corresponding to the first region 602.

The height or the distribution density of the surface structure (i.e. the transferring bumps) is regulated to control the amount of the alignment material coated on the APR printing plate in printing, so as to make the alignment material transferred to the second region 604 less than the alignment material transferred to the first region 602 and make the alignment material transferred to the third region 606 more than the alignment material transferred to the first region 602, and thus form the first alignment layer 616 in various thicknesses.

Likewise, except the method of forming the first alignment layer 616 with different thicknesses or the second alignment layer 624 with different thicknesses in the above embodiment, the first alignment layer 616 or the second alignment layer 624 can further be formed by other proper methods, such as inkjet printing, photolithography, dry film attaching, or the combinations thereof.

Furthermore, giving emphasis on the problem that the spacers may damage the driving circuit without regarding whether the conductive material is obstructed by the alignment layer from connecting the electrode layer and the pads or not, another embodiment of the present invention may increase the thickness of the first alignment layer in the third region and maintain the first alignment layer (or the second alignment layer) in the first region and the second region in substantially the same thickness is the further other embodiment of the invention. Description of other details has been aforementioned, so no further details are provided herein.

In summary, the present invention modulates thicknesses of the alignment layer in different regions of the display panel, wherein the thickness of the alignment layer corresponding to the pad and the conductive material is substantially less than that in the other region, such that after the active device array substrate and the opposite substrate are bonded with each other, the conductive material can penetrate the alignment layers on the active device array substrate and the opposite substrate respectively to conduct the electrode layer and the pad for providing a signal transmission path there between. Owing to the thinner thickness of the alignment layer corresponding to the pad and the conductive member, no more does the alignment obstruct the conductive member to conduct the electrode layer and the pad. Furthermore, the alignment layer is preserved to completely cover the region except the bonding area of the conductive material, so as to provide an effective alignment near the conductive material in preventing light leakage due to abnormal alignment of the display medium, e.g. liquid crystal molecules. In addition, to prevent the driving circuit on the active device array substrate from being pressed and damaged by the spacers, a thickness of the first alignment layer corresponding to the driving circuit can be increased to buffer the pressure applied by the spacers.

It will be apparent to those skilled in the art that various modifications and variations can be made to the structure of the present invention without departing from the scope or spirit of the present invention. In view of the foregoing, it is intended that the present invention cover modifications and variations of the present invention provided they fall within the scope of the following claims and their equivalents.

What is claimed is:

1. A display panel having a first region, a second region and a third region, and the display panel comprising:
  an active device array substrate, comprising:
    an active device array;
    a pad, disposed in the second region;
    a driving circuit, disposed in the third region;
    a first alignment layer, covering the first region, the second region and the third region, wherein a thickness of the first alignment layer in the first region is substantially greater than a thickness of the first alignment layer in the second region, the ratio of the thickness of the first alignment layer in the second region to the thickness of the first alignment layer in the first region is substantially greater than zero and substantially less than or equal to 0.43, and a thickness of the first alignment layer in the third region is substantially greater than the thickness of the first alignment layer in the first region or the second region;
  an opposite substrate, disposed opposite to the active device array substrate, and the opposite substrate comprising:
    an electrode layer;
    a second alignment layer, covering the electrode layer, wherein a thickness of the second alignment layer in the first region is substantially greater than a thickness of the second alignment layer in the second region, and the ratio of the thickness of the second alignment layer in the second region to the thickness of the second alignment layer in the first region is substantially greater than zero and substantially less than or equal to 0.43;

a display medium, disposed between the active device array substrate and the opposite substrate;
a plurality of spacers, disposed between the active device array substrate and the opposite substrate for maintaining a cell gap; and
a conductive member, disposed between the active device array substrate and the opposite substrate, wherein the conductive member is located in the second region and corresponding to the pad, and the conductive member penetrates the first alignment layer and the second alignment layer to connect the electrode layer and the pad.

2. The display panel according to claim 1, wherein the first region comprises a display region, the active device array is located in the display region, and the third region is located in a peripheral circuit region outside the display region.

3. The display panel according to claim 1, wherein the thickness of the first alignment layer in the third region is greater than the first alignment layer in the first region, and the thickness of the first alignment layer in the first region is greater than the first alignment layer in the second region.

4. An active device array substrate, having a first region, a second region and a third region, and the active device array substrate comprising:
an active device array;
a pad, disposed in the second region;
a driving circuit, disposed in the third region; and
a first alignment layer, covering the first region, the second region and the third region, wherein a thickness of the first alignment layer in the first region is substantially greater than a thickness of the first alignment layer in the second region, the ratio of the thickness of the first alignment layer in the second region to the thickness of the first alignment layer in the first region is substantially greater than zero and substantially less than or equal to 0.43, and a thickness of the first alignment layer in the third region is substantially greater than the thickness of the first alignment layer in the first region or the second region.

5. The active device array substrate according to claim 4, wherein the first region comprises a display region, the active device array is located in the display region, and the third region is located in a peripheral circuit region outside the display region.

6. The active device array substrate according to claim 4, wherein the thickness of the first alignment layer in the third region is greater than the first alignment layer in the first region, and the thickness of the first alignment layer in the first region is greater than the first alignment layer in the second region.

7. A manufacturing method of a display panel, comprising:
providing an active device array substrate having a first region, a second region and a third region, the active device array substrate comprising:
an active device array;
a pad, disposed in the second region;
a driving circuit, disposed in the third region;
a first alignment layer, covering the first region, the second region and the third region, wherein a thickness of the first alignment layer in the first region is substantially greater than a thickness of the first alignment layer in the second region, the ratio of the thickness of the first alignment layer in the second region to the thickness of the first alignment layer in the first region is substantially greater than zero and less than or equal to 0.43, and a thickness of the first alignment layer in the third region is substantially greater than the thickness of the first alignment layer in the first region or the second region;
providing an opposite substrate disposed opposite to the active device array substrate, and the opposite substrate comprising:
an electrode layer;
a second alignment layer, covering the electrode layer, wherein a thickness of the second alignment layer in the first region is substantially greater than a thickness of the second alignment layer in the second region, and the ratio of the thickness of the second alignment layer in the second region to the thickness of the second alignment layer in the first region is substantially greater than zero and substantially less than or equal to 0.43;
providing a display medium between the active device array substrate and the opposite substrate;
providing a plurality of spacers between the active device array substrate and the opposite substrate for maintaining a cell gap; and
disposing a conductive member between the active device array substrate and the opposite substrate, wherein the conductive member is located in the second region and corresponding to the pad, and bonding the active device array substrate and the opposite substrate, wherein the conductive member penetrates the first alignment layer and the second alignment layer to connect the electrode layer and the pad.

8. The manufacturing method according to claim 7, wherein the first region comprises a display region, the active device array is located in the display region, and the third region is located in a peripheral circuit region outside the display region.

9. The manufacturing method according to claim 7, wherein the method of forming the first alignment layer or the second alignment layer comprises performing a transfer printing process by an Asahi Photosensitive Resin printing plate (APR printing plate) to print alignment material on the active device array substrate or the opposite substrate.

10. The manufacturing method according to claim 9, wherein the APR printing plate has a plurality of transferring bumps thereon, and the distribution density of the transferring bumps corresponding to the first region is substantially less than the distribution density of the transferring bumps corresponding to the third region.

11. The manufacturing method according to claim 9, wherein the APR printing plate has a plurality of transferring bumps thereon, and the height of the transferring bumps corresponding to the first region is substantially less than the height of the transferring bumps corresponding to the third region.

12. The manufacturing method according to claim 7, wherein the thickness of the first alignment layer in the third region is greater than the first alignment layer in the first region, and the thickness of the first alignment layer in the first region is greater than the first alignment layer in the second region.

* * * * *